Figure 1:
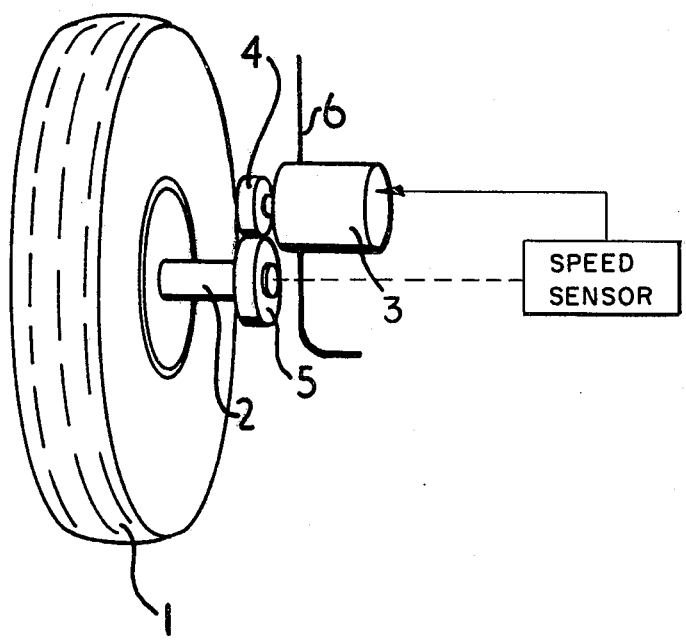

United States Patent [19]

Holmes

[11] 3,951,226
[45] Apr. 20, 1976

[54] SKID-CONTROL SYSTEM

[75] Inventor: Thomas Holmes, Sutton Coldfield, England

[73] Assignee: Dunlop Limited, London, England

[22] Filed: Feb. 14, 1972

[21] Appl. No.: 226,073

[30] Foreign Application Priority Data
Feb. 22, 1971 United Kingdom............. 5168/71

[52] U.S. Cl. .................... 180/82 R; 303/21 CG
[51] Int. Cl.² ................................. B60T 8/02
[58] Field of Search ........... 180/82; 317/5; 280/32; 244/108; 303/21 CG; 188/181 R

[56] References Cited
UNITED STATES PATENTS
| | | | |
|---|---|---|---|
| 2,401,628 | 6/1946 | Eksergian | 180/82 |
| 3,541,406 | 12/1970 | Etienne | 303/21 BE |
| 3,622,973 | 12/1971 | Domann | 303/21 CG |
| 3,659,907 | 5/1972 | Gunsser et al. | 317/5 |

FOREIGN PATENTS OR APPLICATIONS
| | | |
|---|---|---|
| 603,792 | 6/1948 | United Kingdom |
| 552,266 | 3/1943 | United Kingdom |

Primary Examiner—Robert J. Spar
Assistant Examiner—Ross Weaver
Attorney, Agent, or Firm—Stevens, Davis, Miller & Mosher

[57] ABSTRACT

A method and apparatus for preventing a continuing non-rotating wheel condition in a wheel on a moving vehicle, comprising applying, by means for driving the wheel, a positive drive to the wheel to drive the wheel up to a predetermined low speed and disengaging, by means for disengaging the drive, the drive from the wheel when the wheel is rotating at a speed above said predetermined speed, of which the following is a specification.

11 Claims, 2 Drawing Figures

SKID-CONTROL SYSTEM

This invention relates to a skid-control system, particularly to a method and apparatus for prevention of a stationary wheel condition in a moving aircraft.

In a tyre which is sliding in a non-rotating wheel condition over a low-friction macro textured surface the phenomenon of reversion may occur. The conditions under which reversion can occur are a function of the inflation pressure of the tyre, the tread hardness and the speed at which the tyre is sliding, since the energy absorbed by the tyre must be sufficiently high to cause the rubber to heat up to a point where degradation can occur. In general, the higher the tyre inflation pressure, the lower the sliding speed at which reversion can occur.

In a vehicle such as aircraft known hitherto, where the method of propulsion does not act through the wheels, the wheels rely on friction between the tyre and the ground to maintain rotation of the wheel. Thus it is possible on a low friction surface for an aircraft to move off from a stationary condition without the wheels commencing to rotate.

According to the present invention a method for the prevention of a continuing non-rotating wheel condition in a wheel on a moving vehicle on the ground comprises applying to the wheel a positive drive to drive the wheel up to a predetermined low speed and disengaging said drive when the wheel is rotating at a speed above said predetermined speed.

According to the present invention also an apparatus for the prevention of a continuing non-rotating wheel condition in a wheel on a moving vehicle on the ground comprises means for driving said wheel up to a predetermined low speed and means for disengaging the drive when the wheel is rotating at a speed above said predetermined low speed.

The invention is particularly applicable to aircraft wheels, these not transmitting propulsive power of the aircraft although they are required to exert braking forces on the aircraft when on the ground.

The positive drive may be applied to the wheel by means of an electric motor associated with the wheel, and geared to drive the wheel at up to a predetermined low speed, for example, 1 m.p.h. Particularly on aircraft, where it is preferred to have the wheels independently operated, there is preferably one motor for each wheel. In suitable circumstances, however, one motor may be made to drive several wheels. Some aircraft are at present provided with axial electric motors to drive cooling fans for the disc brakes on each wheel. These are not generally used when the aircraft is moving on the ground and could therefore also be used to provide the positive drive for the wheel in this invention.

The means for disengaging the drive when the wheel is rotating at a speed above said predetermined low speed may be a freewheel, the motor being arranged to drive the wheel at constant speeds the constant speed being the predetermined low speed.

Alternatively sensing means may be provided which operates to disengage the drive when the wheel is rotating at above the predetermined speed, and to initiate the drive when the wheel rotation speed falls below a second predetermined speed, which may be the same as, or lower than, the first.

In another alternative method of carrying out the invention the drive is disengaged if a brake is applied to the wheel but is automatically energised if the brakes are released, subject to its being engaged only if the wheel rotation speed falls below a second predetermined speed as above. In this way the drive is engaged as soon as the brakes are released on starting from rest but will not be in operation if it is desired to brake the wheel to a standstill.

In a further arrangement in this invention where the wheel may be subject to a brake, sensing means are provided to sense a condition just prior to the wheel becoming stationary or when its rotation falls below a second predetermined speed as above. This sensing means operates to release the brake on the wheel, if the brake is on, and to initiate the drive on the wheel. When the wheel is rotating at above the predetermined low speed the drive is discontinued and the brake, if still on, is allowed to re-engage the wheel by the sensing means.

Alternatively, instead of arranging the sensing means to release the brake when the wheel is about to stop rotating, the sensing means may operate the drive to rotate the wheel and the brake, if the brake is engaged.

In these various examples of apparatus the sensing means used to sense the speed of rotation of the wheel may be a photo-electric cell or tachometer. Such a sensing means may control a brake by a solenoid valve or switch in the brake circuit and may also control an electric motor to supply the drive to the wheel and/or a clutch, e.g. an electromagnetic clutch, in the drive from the motor to the wheel.

In the arrangements described above, except the case where the drive is disengaged when the brakes are applied, provision may be made for switching off the drive system when it is desired to brake the vehicle to a standstill and park the vehicle in a stationary condition.

The invention will now be described by way of example only with reference to the accompanying drawing FIGS. 1 and 2 which schematically illustrate two embodiments of the application of the invention to an unbraked wheel which may be mounted on e.g. an aircraft.

A wheel and tyre 1 is fixedly mounted on a freely rotatable shaft 2 carried in a bearing on a vehicle 6 e.g. an aircraft undercarriage. A constant speed electric motor 3 is mounted on the vehicle 6 and arranged to drive the shaft 2 through drive take-off sprocket 4 and a free-wheel 5.

In operation e.g. when the aircraft is about to take off on a slippery surface the motor is switched on. As the aircraft takes off the motor will rotate at a constant predetermined speed which corresponds e.g. to a wheel speed of the order of 1 m.p.h. Provided the wheel has frictional grip on the ground as the aircraft takes off the free wheel will operate allowing the wheel to rotate at a speed corresponding to the speed of the aircraft. If wheel grip is lost, however, the motor will prevent the wheel coming to rest and thus prevent the possibility of serious reversion taking place in the tyre.

Figure 2:
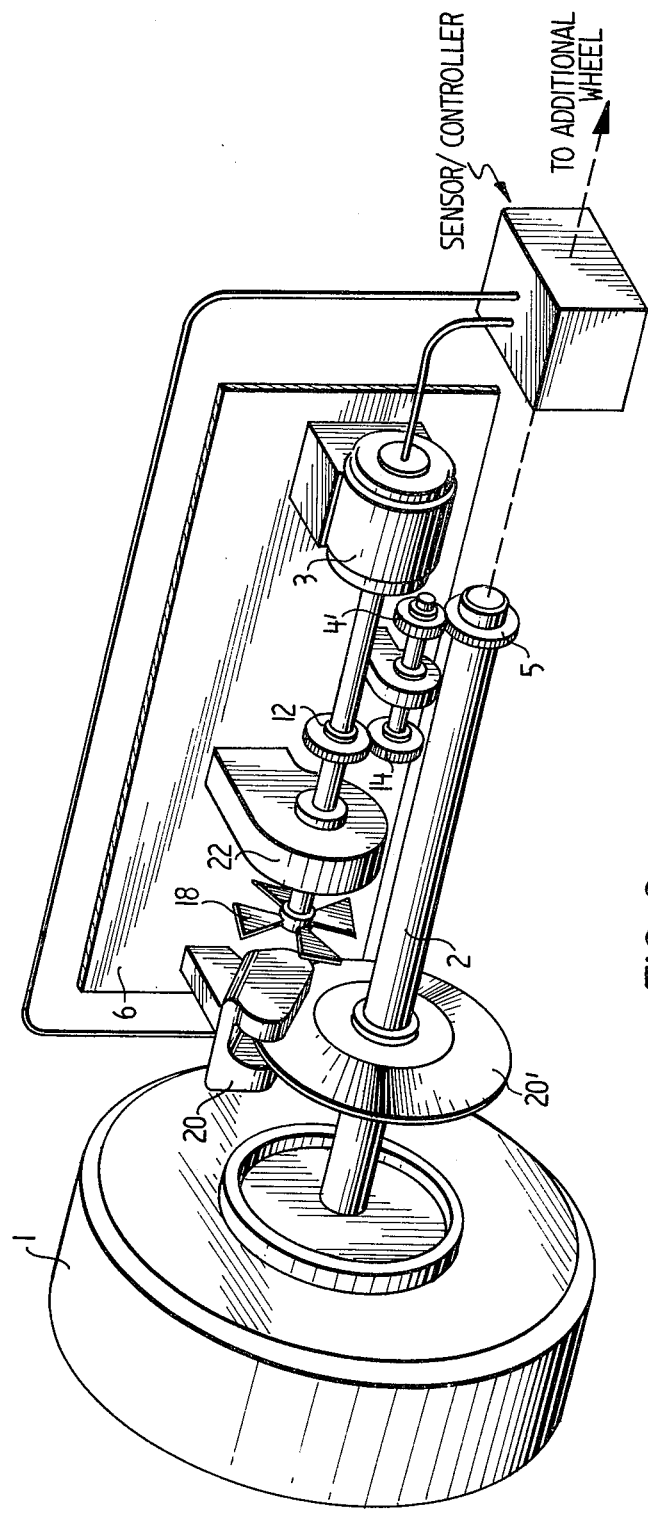

FIG. 2, an addition to the elements shown in FIG. 1, includes a gear arrangement 12, 14, driven by a motor 3, which drives a gear 4' through a (e.g. electromagnetic) clutch 16. The gear 4' drives the freewheel 5 in the same manner as the first arrangement. The motor 3 also drives a cooling fan 18 for a disc brake arrangement 20, 20', also through a clutch mechanism 22. The brake may also be applied to the wheel and in this case a sensing device, of known type, can be provided to switch out the brake if the wheel speed falls below that corresponding to the motor speed whilst the aircraft speed is above that speed. When the aircraft speed is below the speed corresponding to the motor speed the motor can be switched off or the drive disconnected by means of the clutch manually, or automatically.

Having now described my invention, what I claim is:

1. An apparatus for preventing non-rotation of a wheel of a moving vehicle on the ground, said vehicle being driven by means other than said wheel, comprising:
   means for positively driving said wheel up to a first predetermined speed of rotation thereof;
   means for disengaging said driving means when the rotational speed of said wheel is above said first predetermined speed;
   brake means coupled to said wheel for engagement therewith; and
   means for sensing when the speed of rotation of said wheel falls below a second predetermined speed lower than said first speed of rotation, said sensing means being coupled to said brake means for releasing said brake means when said second predetermined speed is sensed;
   wherein said sensing means is further coupled to said driving means for re-engaging said driving means with said wheel to drive said wheel up to said first predetermined speed, said sensing means thereafter sensing said first predetermined speed to disengage said driving means from said wheel.

2. The apparatus according to claim 1, wherein said driving means comprises an electric motor and a gear mechanism coupling said motor to said wheel.

3. Apparatus according to claim 2 wherein each wheel of said vehicle is provided with a motor.

4. Apparatus according to claim 2 wherein a plurality of wheels on said vehicle are driven by one motor.

5. Apparatus according to claim 1 wherein the wheels of the vehicle are provided with axial electric motors to drive cooling fans for brakes associated with each wheel, said axial motors alternatively driving each wheel to the predetermined speed and the cooling fans.

6. The apparatus according to claim 1, wherein said driving means comprises a motor and a freewheel coupling said motor to said wheel, said freewheel disengaging said motor from driving said wheel when said first predetermined speed is reached.

7. A method for preventing non-rotation of a wheel of a moving vehicle on the ground, said vehicle being driven by means other than said wheel, comprising the steps of:
   applying a positive driving force to said wheel when in an initially non-rotating condition to drive said wheel up to a first predetermined speed of rotation;
   sensing the speed of rotation of said wheel;
   disengaging said positive driving force upon said first predetermined speed being sensed; and
   reapplying said positive driving force to said wheel upon a second predetermined speed of rotation of said wheel, lower than said first predetermined speed of rotation, being sensed to drive said wheel up to said first predetermined speed.

8. The method according to claim 7, further comprising driving each said wheel of said vehicle independently of each other said wheel thereof.

9. The method according to claim 7, further comprising disengaging a previously applied brake from braking said wheel when said second predetermined speed is sensed, said second predetermined speed being lower than said first predetermined speed.

10. A method for preventing non-rotation of a wheel of a moving vehicle on the ground, said vehicle being driven by means other than said wheel, comprising the steps of:
    applying a positive driving force to said wheel to drive said wheel up to a predetermined speed of rotation of about 1 mile per hour; and
    disengaging said positive driving force when said wheel is rotating at a speed above said predetermined speed.

11. A method for preventing non-rotation of a wheel of a moving vehicle on the ground, said vehicle being driven by means other than said wheel, comprising the steps of:
    applying a positive driving force to said wheel when in an initially non-rotating condition to drive said wheel up to a first predetermined speed of rotation;
    applying a brake to said wheel to disengage said positive driving force when said wheel is rotating at a speed above said first predetermined speed; and
    reapplying said positive driving force upon release of said brake when the speed of rotation of said wheel falls below a second predetermined speed of rotation of said wheel lower than the first predetermined speed thereof.

* * * * *